April 16, 1968 E. D. MOXLEY 3,378,680
COMBINED ILLUMINATED COASTER AND HOLDER
Filed March 16, 1966
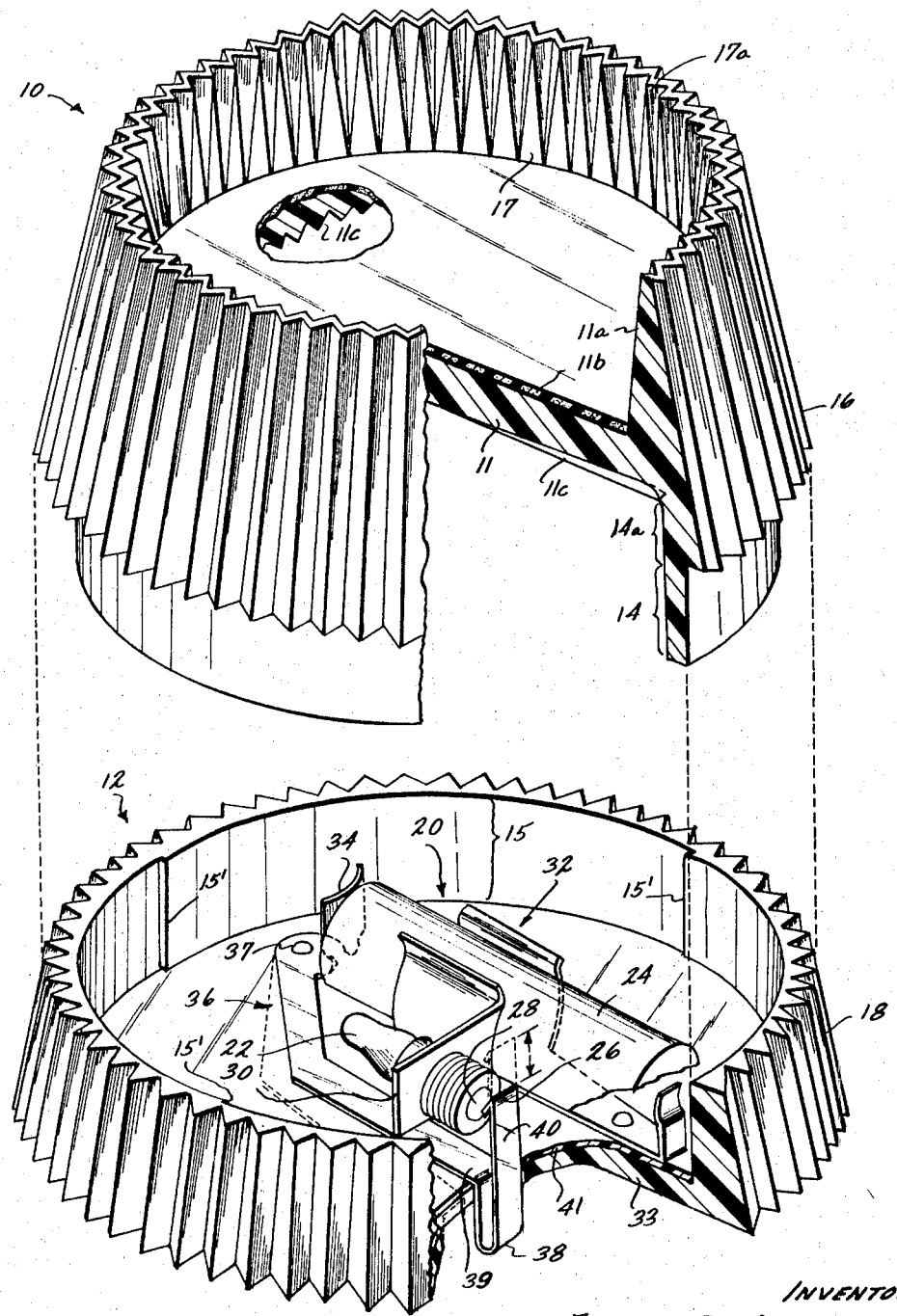
INVENTOR
ELMER D. MOXLEY
BY Richard D. Fengel
HIS ATTORNEY

United States Patent Office 3,378,680
Patented Apr. 16, 1968

3,378,680
COMBINED ILLUMINATED COASTER
AND HOLDER
Elmer D. Moxley, 14 Narcissa Drive, Palos
Verdes Peninsula, Calif. 90274
Filed Mar. 16, 1966, Ser. No. 534,797
11 Claims. (Cl. 240—6.4)

ABSTRACT OF THE DISCLOSURE

A holder or coaster for beverage glasses comprising a truncated, cone-shaped assembly including separable lower base and upper receptacle members having inner and outer light-diffusing, serrated surfaces formed from transparent, high-impact polystyrene wherein adjacent portions of said base and receptacle portions comprise overlapping, eccentric and rotatably interlocking portions forming an enclosure for electrical circuit means for illuminating said coaster, beverage glass and contents.

---

The present invention is directed to a combined illuminated coaster and holder and, more particularly, to a holder for liquid containers such as beverage glasses and the like, and to electrical apparatus for illuminating said holder.

In many instances, it is desirable to provide an interesting and attractive coaster. Equally important, it is desirable to provide certain protective functions. The present invention provides a holder which insulates a container for hot or cold liquids, provides a surface for easily gripping the container, and also holds condensation or other liquids forming and accumulating on the outside and bottom of a container of cold liquids to protect surfaces of furniture and, more important, to retain said accumulated condensation or other liquid on the outside of the container during handling, e.g., when consuming iced beverages, to prevent dripping or spilling of the condensation or beverage down the side of a glass and on clothing, carpeting, upholstery, etc. Prior to the present invention, many coasters for liquid containers have been provided which only serve to protect the resting surface from damage; however, this has been found to be unsatisfactory because of the drippage from the container when lifting the container from the coaster, particularly due to the accumulation of liquid in the coaster.

An object of the present invention is to provide an improved holder for containers.

Another object is the provision for improved illumination of a holder for containers.

A further object of the present invention is to provide an improved coaster for containers for cold or hot liquids.

Another object is to provide a no-drip container which, when lifted to the lips, any condensation which has collected on the glass will be retained by the container's absorbent moisture collector and kept from unpleasant dripping or running.

Still another object is the provision of a holder for containers which is readily attached to and removable from the container and retains liquids accumulating on and "running-down" the outside of the container to prevent depositing of these accumulated liquids on resting surfaces or elsewhere during handling.

A further object of the present invention is to provide a holder for containers which provides an attractive and improved gripping surface for handling the container.

Another object of the present invention is the provision of a container holder which has the foregoing features and advantages and insulates the container for handling.

Still another object is to provide a holder for containers which protects those handling the container from various accumulations on the outside of the container.

A still further object is to provide a novel method of illuminating a container filled with a semi-clear liquid so as to have it glow or become lighted when lifted from any surface to give an appealing and unique method of identifying said container in a darkened room or area by means of variable colored lights supplied with each coaster.

Other objects and features of the invention will become apparent to those skilled in the art as the disclosure of the present invention is made in the following detailed description of a preferred embodiment of the invention illustrated in the accompanying sheet of drawings, in which:

The figure is an exploded pictorial view, sectional and broken in part, of the container holder of the present invention showing the lower base section and electrical switching apparatus for illuminating the holder (and liquid container, not shown), and an upper receptacle section for removably securing a container seated therein.

Referring now to the drawings for the detailed description, the figure shows the preferred container holder of the present invention to comprise an upper receptacle section 10 for seating a container (not shown) a lower base section 12, and electrical switching apparatus 20 disposed in the base section 12 for illuminating the holder. The sections 10 and 12, shown separated in the drawings for clarity in illustration, are normally joined by seating the lower recessed portion 14 of the upper section 10 inside the lower base section 12. The container holder thus formed takes the shape of a truncated cone in which outer serrated surfaces 16 and 18 form continuous side surfaces of the cone. The area enclosed by the joined sections 10 and 12 forms a complete enclosure for the electrical switching apparatus 20.

Further, the joined sections 10 and 12, which form the complete container holder, are interlocked after seating by rotation of these sections, one relative to the other, whereby eccentric opposing outer and inner surfaces of portions 14 and 15, respectively, are forced against one another in interlocking engagement. The contour of the inner eccentric surface of portion 15, including vertical edges 15' of eccentric sections, is shown clearly in the drawing. Corresponding vertical edges of the eccentric surface of portion 14 are not visible.

The upper receptacle section 10 of the holder includes an upper portion 14a continuing from portion 14 to provide sufficient area within the enclosure formed by joined sections 10 and 12 for the electrical switching apparatus 20. The top portion of upper receptacle section 10 includes an intermediate wall 11 which supports the container (not shown) seated in the upper recess formed by the wall 11 and radially tapering side wall 11a. The upper edge of the side wall 11a includes sharply defined serrations on inner and outer edge surfaces. Lower surface of intermediate wall 11 is serrated as shown by radially formed serrations 11c. The depth and height of the serrations 11c are shown to decrease toward the center of wall 11c causing radial diffusion of the light from bulb 22 to produce an attractive illumination pattern visible when viewed from the top or when viewed through the open end of the beverage glass seated therein and any light transmission contents thereof, due to transmission of the diffused light pattern therethrough. An important feature of the present invention is provided by the radial inward taper of the side wall 11a toward the center axis and the gradually widening inner acrcuate or concave surfaces 17 (flattening of the serration peaks). Tapered channels 17a are formed between arcuate surfaces 17, which provide flow ducts to the bottom of the upper recess for accumulated condensation or other liquids on the outside of the container seated in this recess. The widening arcuate surfaces 17 have decreasing radii to form a radially inward taper to produce a "forced-fit" between the bottom edge of the container (not shown) having a corresponding outer radius. The inner radius, at the upper edge formed by inner peaks of the serrations, is slightly larger than the radius of the bottom edge of the container, which often has a gradually increasing outer radius towards the top edge thereof. Thus, the upwardly opening recess of the receptacle section 10 receives the bottom edge of a container (i.e., a common 6 oz. beverage glass having a smooth, approximately cylindrical outer surface) to seat the container therein. A slight pressure on the top of the container causes it to be completely seated in the recess, wherein the bottom section of the container, equal to the depth of the recess, forms a "forced-fit" with the arcuate surfaces 17. As a result, the holder is secured to the container in order to at least provide for handling without the holder dropping from the container when only the container is grasped and lifted during handling.

The holder, except for the electrical switching apparatus, semi-rigid plastic sheet 41 for mounting this apparatus and a liquid absorbent gasket 11b, comprises high-impact polystyrene which has the desirable characteristics of being an insulator, flexible and stable under expected temperature variations. The flexibility of this material provides for variations in radii of the containers seated in the holder and provides the necessary resiliency for the "forced-fit" desired for securing the container seated in the upper recess.

As noted supra, condensation and other liquids on the outside surface of a container seep through the ducts 17a to the bottom of the upper recess. In order to increase the retention capacity of the holder for these liquids, a layer of plastic foam (approximately 1/32 inch thick), which is highly absorbent for liquids and semi-transparent to allow illumination of the liquid from the light source below, is attached to the upper surface of wall 11, as shown. While the liquids are retained in the bottom of the recess when the container is seated therein, the plastic foam provides spacing for absorbing a relatively large quantity of liquid between the bottom of the seated container and wall 17, and, further, acts to retain the expected accumulation of these liquids.

Both the outer and inner serrations of the holder cause diffusion of the light. The serrations on the outer surface also provide a gripping surface for handling the holder and container seated in the holder. Light illumination is provided by a focused light bulb 22 which is energized by battery 24 through circuit connections including movable switch contact 26 engaging the inner terminal 28 of the bulb base. The bulb 22 is supported and secured in the position shown by a lateral flange 30 of a stationary switch member 32, which is fastened to the plastic sheet 41 which is, in turn, attached to the bottom wall 33 of the base section 12, as shown, to remain in a fixed position therein. The upwardly projecting clips of stationary member 32, resiliently and firmly retain the battery 24 in the position shown and maintain contact alignment between two end terminals of the battery and battery terminal contacts. The curved battery terminal contact 34 is formed as an integral part of a separate movable switch member 36 which is movable about the axis of rivet or pin 37 which secures the movable member 36 to the plastic sheet 41 attached to the bottom wall 33.

The stationary and movable switch members 32 and 36 are formed from conductive, highly resilient, stiff material, i.e., Phosphor bronze, which firmly retains the battery 24 and end terminals in proper alignment with battery terminal contacts and also provides for vertical (actuating) movement of switch contact 26 formed on the end of the vertical section of movable switch member 36. This vertical movement for actuation of the switching apparatus is produced by setting the holder on a table surface, for example, by engagement of the table surface (not shown) and the switch actuator portion 38 of the movable member 36. As shown, a switch actuator portion 38 projects down through an aperture in the bottom wall 33 a sufficient amount to cause vertical movement of the switch contact 26 past the bulb terminal 28 and the entire base of bulb 22 to an actuated position, shown in dashed lines in the drawing, whenever the holder is placed on a table surface. Since the switch contact 26 is spring biased laterally into engagement with center bulb terminal 28 to provide an electrical contact therewith, it is important that the switch contact 26 clear the bulb base (forming the other bulb terminal) whenever actuated by placing the holder on a table surface in order to prevent a possible short circuit between the switch contact 26 and the outer portion of the base of bulb 22 which portion forms the other terminal of bulb 22. Accordingly, it is important that the switch actuator portion 38 project through and past the bottom wall 33 to cause the switch contact 26 to adequately clear and be displaced away from the base of bulb 22 as shown by dashed lines in the drawing. Preferably, the inner terminal 28 projects past the base sufficiently whereby switch contact 26 does not engage the remainder of the bulb base during actuation of the switching apparatus. The aperture through which the actuator portion 38 passes is sufficiently wide to provide for lateral movement of the actuator 38 and switch contact 26 into an "off" or inactive position, shown in dashed lines in the drawing, by pressing against the side of actuator 38 causing the movable member 36 to be pivoted about the axis of pin 37. The lateral movement of the actuator 38 is sufficient to produce lateral spacing of the switch contact 26 and the base of bulb 22, as shown by the dashed lines in the drawing.

In operation, the electrical switching apparatus, in its lateral "on" position, as shown in the drawing, provides for illumination of the holder (container and liquid therein of a transparent beverage glass) whenever the holder is lifted from a table surface to allow the actuator to pass through and past the bottom wall 33 whereby the switch contact engages bulb terminal 28. It is important that the downward vertical movement of the switch contact 26 not be insufficient or too great so as to cause the terminal contact 26 to engage the lower outer edge of the bulb base which outer edge surrounds the inner terminal 28 of bulb 22. The vertical centering of switch contact 26 on bulb terminal 28 is controlled by the distance between the switch contact 26 and the portion 39 of the movable switch member. This distance is controlled by adjusting the length of the vertical section 40 between the switch contact 26 and the plane of the portion 39 projected to intersect portion 40 during forming of the actuator 38.

Another feature of the electrical apparatus is the provision of substantial improvements in maintaining circuit continuity, particularly between curved contact 34 and adjacent battery terminal. The curved contact 34 provides for lateral movement of movable member 36 between "off" and "on" positions without deforming the contact 34 or supporting connection to the remainder of movable member 36. The curved contact 34 has a substantially constant radius to the vertical axis of pin 37 (coaxial) whereby lateral movement of the movable member 36 does not tend to change the contacting area on the battery terminal or the force exerted thereon which otherwise would cause deformation of the curved contact 34 or supporting connection to the remainder of movable member 36.

In an alternate arrangement the operation of the switching apparatus is reversed to provide illumination of the holder only when the holder is placed on a table surface, and no illumination when the holder is lifted from a table surface, for example. In this alternate arrangement of the actuator and switch contact 26, which is evident from the foregoing description, the length of section 40 is shortened so that switch contact 26 is normally positioned below the inner terminal 28 or bulb 22. As a result, the bulb is de-energized and the switch is "open" until the holder is placed on a table surface which forces the actuator 38 up a distance sufficient to position switch contact 26 on the inner terminal 28 to energize the bulb 22.

In light of the above teachings, various modifications and variations of the present invention are contemplated and will be apparent to those skilled in the art without departing from the spirit and scope of the invention.

What is claimed is:

1. A holder for supporting liquid container in an upright position, said holder comprising:
   a receptacle section having bottom and side walls for receiving and holding the base of said container, said side walls having serrations formed in the inner surface, said serrations being formed of substantially nondeformable material to maintain their shape for rigidly engaging the opposing outer surface of the base of said container to provide and maintain a series of vertical channels substantially as formed by said serrations in said side wall for receiving liquid on the outer surface of the container and passing said liquid to said bottom wall.

2. The holder of claim 1 in which said serrations formed in said side walls are tapered to produce a uniform narrowing of said channels from the upper to lower portions of said side walls in order to provide wide openings of said channels for receiving said liquid flowing down the outer surface of the container and narrowing channels for trapping said liquid at the bottom of receptacle section.

3. The holder of claim 1 in which said serrations are formed to produce substantially triangular channels of gradually decreasing dimensions toward the bottom of said receptacle section and the inner surface formed by inner radial portions in said side walls are formed to produce arcuate surfaces of corresponding gradually increasing areas for engaging the outer surface of the base of said container wherein said arcuate surfaces taper radially inward to provide a larger annular opening at the upper peripheral edge of said side wall for receiving the base of said container and lower portions of the arcuate flat surfaces firmly engaging the outer surfaces of the base of the container for gripping said container base to enable the holder to be lifted by lifting the container.

4. The holder of claim 3 in which material, having the property of being highly liquid absorbent, is disposed in said receptacle section to absorb and retain the liquid passed through said channels to the bottom of said receptacle section.

5. The holder of claim 1 in which said holder comprises an assembly including said receptacle section and a separate base section having bottom and side walls forming an enclosure with the bottom walls of said receptacle section, said receptacle and base side walls having eccentric outer and inner opposing adjacent side portions respectively, for providing frictional engagement of said adjacent side portions upon relative rotation after seating to secure said sections to form said assembly, and electrical circuit means producing light for illuminating said holder disposed in said enclosure.

6. The holder according to claim 5 in which said holder is formed from light transmissive material and the bottom wall of said receptacle section includes an irregular surface for diffusing the light produced by said electrical means and transmitting said light into liquids in said container which is formed of light transmissive material.

7. The holder of claim 6 in which said electrical circuit means includes a light bulb for illuminating said holder and a battery for energizing said light bulb.

8. The holder of claim 6 in which said electrical means comprises switching means secured to base section and including a movable switch arm including an actuator section projecting outside said enclosure through the bottom wall of said base section for engaging a resting surface for said holder to position said movable switch arm to actuate said switching means.

9. The holder according to claim 8 in which said assembly is a truncated cone having outer serrated surfaces and formed from high-impact polystyrene wherein adjacent portions of said receptacle and base sections comprise overlapping, eccentric, rotatably interlocking portions forming said enclosure for said electrical means; and said electrical means includes means for supporting said switch arm for orthoganal movements including vertical movement in response to engaging said resting surface and a transverse movement for manually positioning said switch arm to an inactive position to prevent operative actuation of said electrical means for producing light and illumination of said holder.

10. The holder of claim 1 in which said serrations provide sharply defined peaks along at least the upper and inner edge portion of said side wall for producing desired minimum engagement therealong with the opposing outer annular surface portion of the base of said container in order to freely pass liquid into said vertical channels and to the bottom wall and thereby avoid accumulation of liquid on and above said edge portion which would tend to overflow on the outside of said side wall.

11. A coaster for beverage glasses comprising:
   a truncated, cone-shaped assembly including separable base and glass receptacle sections having serrated surfaces formed from transparent, high-impact polystyrene wherein adjacent portions of said base and receptacle sections comprise overlapping, eccentric, rotatably interlocking portions forming an enclosure for electrical circuit means for illuminating said coaster, beverage glass and liquid contained therein;
   said base section comprising an injection-molded, truncated cone having a serrated, light-diffusing and hand-gripping outer surface, and an approximately cylindrical-shaped central opening forming a side wall and a bottom wall for enclosing and mounting electrical switching circuit means for illuminating said coaster and drinking glass;
   said electrical switching circuit means comprising a combined holder for an elongated battery having end terminals, and a light bulb having a base including outer and inner bulb base terminals for illuminating said coaster and drinking glass;
   said circuit means including two separate stationary and movable integral members formed from electrical conductive and resilient spring type material mounted on a semi-rigid plastic sheet attached to said bottom wall including battery terminal contact sections projecting upwardly and spaced apart for engaging said battery terminals under spring pressure to assure firm engagement and circuit continuity through said contact sections to said battery terminals,
   said stationary member further including a bottom portion fixed to plastic sheet attached to said bottom wall and upwardly projecting resilient spring flanges projecting inwardly toward one another to produce a spring pressure on the upper portion of side walls of said battery to removably retain said battery terminals in alignment with said terminal contact sections, one of said flanges further including an outwardly projecting integral side flange forming a bulb base contact having an opening for receiving and retaining said bulb base and electrically connecting said outer bulb base terminal to the battery terminal contact section of said stationary member and axially positioning said inner bulb base contact in engaging alignment with an end section of said movable member which forms a switch contact;
   said movable member of said electrical means further including an elongated portion including said end section projecting upwardly to engage said switch contact and inner bulb base contact, a longitudinal section and an actuator section, said longitudinal section extending substantially parallel to said bottom wall in actuated position, said movable member being mounted for a lateral movement about an axis parallel to its upwardly projecting battery contact section to position said switch contact into and out of alignment with said inner bulb base contact, and a vertical movement of said switch contact, said longitudinal section extending above said bottom wall and parallel to the plane of said bottom wall and said actuator section projecting below said bottom wall through an opening in said bottom wall to engage a resting surface for said coaster, said upwardly projecting end section including a laterally extending section forming said switch contact constructed and arranged to move upwardly past alignment with said inner bulb base contact to interrupt the circuit formed by said electrical circuit means whenever said coaster is resting on said resting surface by upward vertical movement of said actuator section to disengage said switch contact and said inner bulb base contact;

said receptacle member comprising an injection-molded, truncated cone including a side wall having a serrated, light-diffusing inner surface, and a serrated, light-diffusing and gripping outer surface which aligns with the outer serrated surface of the outer wall of said base member and an intermediate bottom wall having a serrated, light-diffusing bottom surface and an upper surface for seating said beverage glass, said serrated inner wall surface being approximately cylindrical and tapered radially and inwardly from the upper edge of its side wall to receive the base section of said glass and flattened serrated inner surfaces for engaging and gripping said base section of said beverage glass to removably secure said glass in said receptacle member, said taper being formed by providing gradually increasing flat surface areas of radially inwardly projections of said inner surface serrations wherein said inner wall forms a substantially smooth but interrupted cylindrical surface adjacent said intermediate wall for securely gripping the base of said beverage glass and providing ducts leading to the intermediate bottom wall for passing liquids under the base of said beverage glass.

References Cited

UNITED STATES PATENTS

| | | | |
|---|---|---|---|
| 2,177,337 | 10/1939 | Stein | 240—6.4 |
| 2,178,812 | 11/1939 | Schade | 240—6.4 |
| 2,224,319 | 12/1940 | Schroyer | 240—6.4 |
| 2,731,056 | 1/1956 | Anson | 215—100.5 |

JOHN M. HORAN, *Primary Examiner.*

G. M. HOFFMAN, *Assistant Examiner.*